United States Patent [19]

Fensom

[11] 3,789,155

[45] Jan. 29, 1974

[54] SIDE-TONE REDUCING CIRCUIT FOR A TELEPHONE SUBSCRIBERS INSTRUMENT

[75] Inventor: Harry William Fensom, Stanmore, England

[73] Assignee: The Post Office, London, England

[22] Filed: July 16, 1971

[21] Appl. No.: 163,251

[30] Foreign Application Priority Data

July 24, 1970 Great Britain .................... 36020/70

[52] U.S. Cl. ............................... 179/81 A, 179/84 T

[51] Int. Cl. ............................................ H04m 1/58

[58] Field of Search .................... 179/81 A, 170 NC

[56] References Cited

UNITED STATES PATENTS

| | | | |
|---|---|---|---|
| 3,546,395 | 12/1970 | Schuh | 179/81 A |
| 3,170,043 | 2/1965 | Hohmann | 179/81 A |
| 3,462,560 | 8/1969 | Holzman | 179/170 NC |
| 3,480,742 | 11/1969 | Gaunt | 179/170 NC |

*Primary Examiner*—William C. Cooper
*Attorney, Agent, or Firm*—Hall & Houghton

[57] ABSTRACT

A circuit for a telephone subscriber's instrument is described including a transistor amplifier in grounded emitter connection for amplifying signals from the transmitter and applying them to the exchange line. A tapped negative feedback path over the amplifier is provided and a receiver is connected to the tapping so that little sidetone from the transmitter is heard, but signals from the exchange line are not greatly attenuated. A zener diode in the emitter circuit of the transistor can be used to produce supply voltage for transmitter and receiver amplifiers. The transmitter amplifier may be provided with a positive feedback path which is effective when the handset is replaced on the cradle so that the transmitter generates an audible signal in response to a calling tone from the exchange.

6 Claims, 5 Drawing Figures

HARRY W. FENSON,

INVENTOR

BY Hall & Houghton

ATTORNEY

HARRY W. FENSON,

INVENTOR

BY Hall & Houghton

ATTORNEY

SIDE-TONE REDUCING CIRCUIT FOR A TELEPHONE SUBSCRIBERS INSTRUMENT

This invention relates to a circuit arrangement for a telephone subscriber's instrument, hereinafter described as a subset, for connection by line wires to a telephone exchange, with particular reference to sidetone suppression and to impedance matching of the subset to the exchange line.

In the circuit arrangement of a known telephone subscriber's subset, as for example the British Telephone No. 706, the impedance presented to the line varies between about 150 ohms and 600 ohms depending upon the line current, with an inductance phase angle varying between about 10° and 30°. In general the impedance affects both the stability and echo characteristics of the complete telephone connection when this includes a four-wire section, and it also influences sidetone and power transfer for signals at the telephone subset. Ideally all telephone subsets, lines, and line balances should have the same matching impedance, but since this differs in dependence upon the different types of lines and circuits with which the telephone subset is terminated. a compromise impedance for the subset has to be made. For a short local line the matching impedance is typically 600 ohms resistive, while for a long local line the impedance is 900 ohms having a phase angle of −45°, where $f$ is the signal $\sqrt{f}$ frequency within the speech band measured in KHz.

One object of the present invention is to provide a telephone subset having an improved anti-sidetone circuit.

According to the invention a circuit arrangement for a telephone subscriber's instrument for connection to the conductors of a telephone exchange line comprises a transmitting means having amplifying means for connection to the line and providing a desired output impedance characteristic and a 180° phase shift, a receiving means and a tapped impedance circuit connected from the output to the input of the amplifying means, said receiver being connected to the tapping of the tapped impedance circuit so that sidetone from the transmitting means in the receiving means is reduced.

The invention will now be described with reference to the accompanying drawings, in which.

Figure 1:
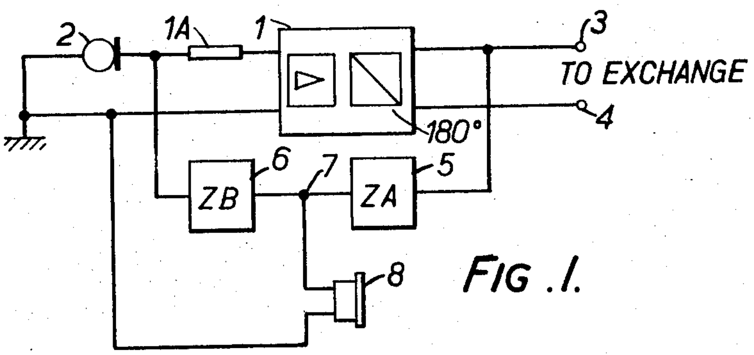
FIG. 1 is a block schematic diagram of the basic circuit arrangement of one example of a subset according to the invention.

The basic circuit arrangement shown in FIG. 1 utilises a type of bridge circuit for eliminating the sidetone. The arrangement employs an amplifier 1 which introduces an inversion or 180° phase shift between input and output and the transmitter 2 is connected via input impedance 1A to the input of the amplifier 1. The output of the amplifier 1 is connected to terminals 3 and 4 and thence to the lines connecting the instrument to the exchange, from which lines the d.c. supply for the amplifier is derived, the exchange providing the output load for the amplifier. Also from the output of the amplifier there is connected a tapped impedance circuit joined to the input of the amplifier, the impedance circuit including impedances 5 (ZA) and 6 (ZB) connected in series and the input impedance 1A to the amplifier. The values of the impedances 5 and 6 and the impedance 1A are chosen so that only a small voltage is set up at the tapping point 7 between the impedances 5 and 6 during transmission from the transmitter 2 so that a desirable low level of sidetone is produced in a receiver 8 connected from the tapping point 7 to the common return. Signals incoming from the exchange lines, however, are fed to the receiver 8 through the impedance 5.

Figure 2:
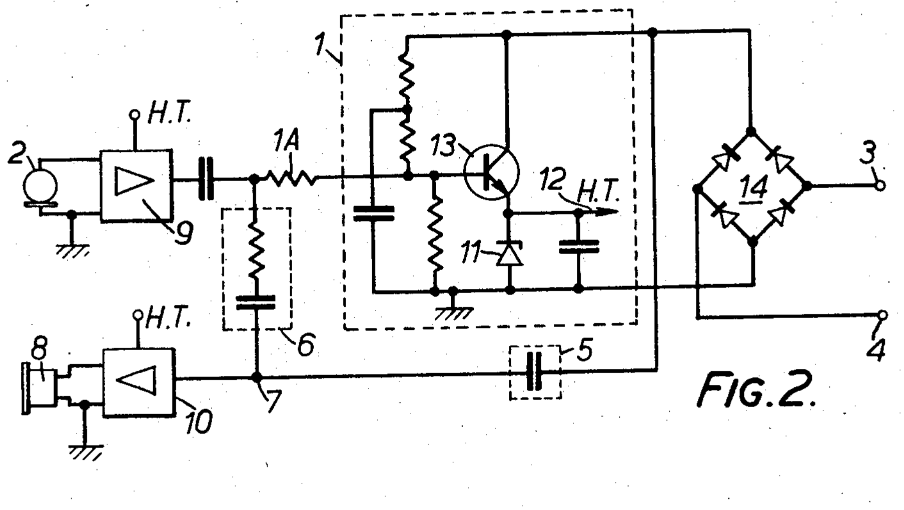
FIG. 2 shows a development of the basic circuit arrangement of FIG. 1 to illustrate a preferred embodiment of the invention.

FIG. 2 shows in greater detail a circuit of the type shown in FIG. 1 in which the transmitter 2 is connected via an amplifier 9 to the input impedance 1A of the amplifier 1 and another amplifier 10 is connected to drive the receiver 8 in response to the signal set up at the tapping point 7. As shown in FIG. 2 the amplifier 1 consists of a grounded emitter transistor amplifier including a transistor 13, the emitter collector path of which is connected in series with a zener diode 11 between the conductors connected to the terminals 3 and 4 and thereby joined to the exchange lines. The zener diode 11 is connected in the emitter circuit of the transistor 13 and sets up a controlled voltage on the conductor 12, this conductor being labelled HT and being connected to the similarly labelled conductors of amplifiers 9 and 10 to provide the power supply for these amplifiers. The use of a zener diode in this way provides a stable voltage for the amplifiers 9 and 10 substantially independent of variations in the voltage received from the exchange lines connected to terminals 3 and 4; this is desirable to ensure more nearly constant gains in the amplifiers 9 and 10 which are not greatly affected by the differing lengths of lines connecting the instrument to the exchange. A rectifier bridge circuit 14 is provided connecting the exchange lines to the output connections of the amplifier 1, to ensure that the voltage applied to the amplifier is always of the correct polarity. In this embodiment of the invention the impedance 5 is shown as consisting simply of a capacitor and the impedance 6 of a capacitor and a resistor in series.

The operation of the circuit of FIG. 2 is the same as that of FIG. 1 in that the signal from the transmitter 2 (after amplification by amplifier 9) is applied through the input impedance 1A to the amplifier 1 and the amplified signal, which is of opposite phase to the signal from the transmitter 2, is applied to one end of the series connected impedances 5 and 6, the other end of which is connected to the end of the input impedance 1A remote from the amplifier 1. The values of the impedances 5 and 6 are so chosen that substantially no signal originating from the transmitter 2 appears at the tapping point 7 thus eliminating the sidetone. The amplified signal from the amplifier 1 is also transmitted along the lines to the exchange substantially without reduction due to the impedances 5 and 6. Incoming signals from the exchange lines connected to terminals 3 and 4 pass through the rectifier bridge 14 and the impedance 5 to the amplifier 10 for reproduction by the receiver 8. The load impedance for the amplifier 1 is provided by the exchange at the other end of the lines connected to the terminals 3 and 4 and variation in this impedance will cause changes in the amplification of the amplifier 1 which will allow small amounts of sidetone to appear at the tapping point 7, the values of the impedances 5 and 6 being chosen to suit an average value of impedance likely to be presented between the terminals 3 and 4 by the exchange lines.

Figures 3, 5:
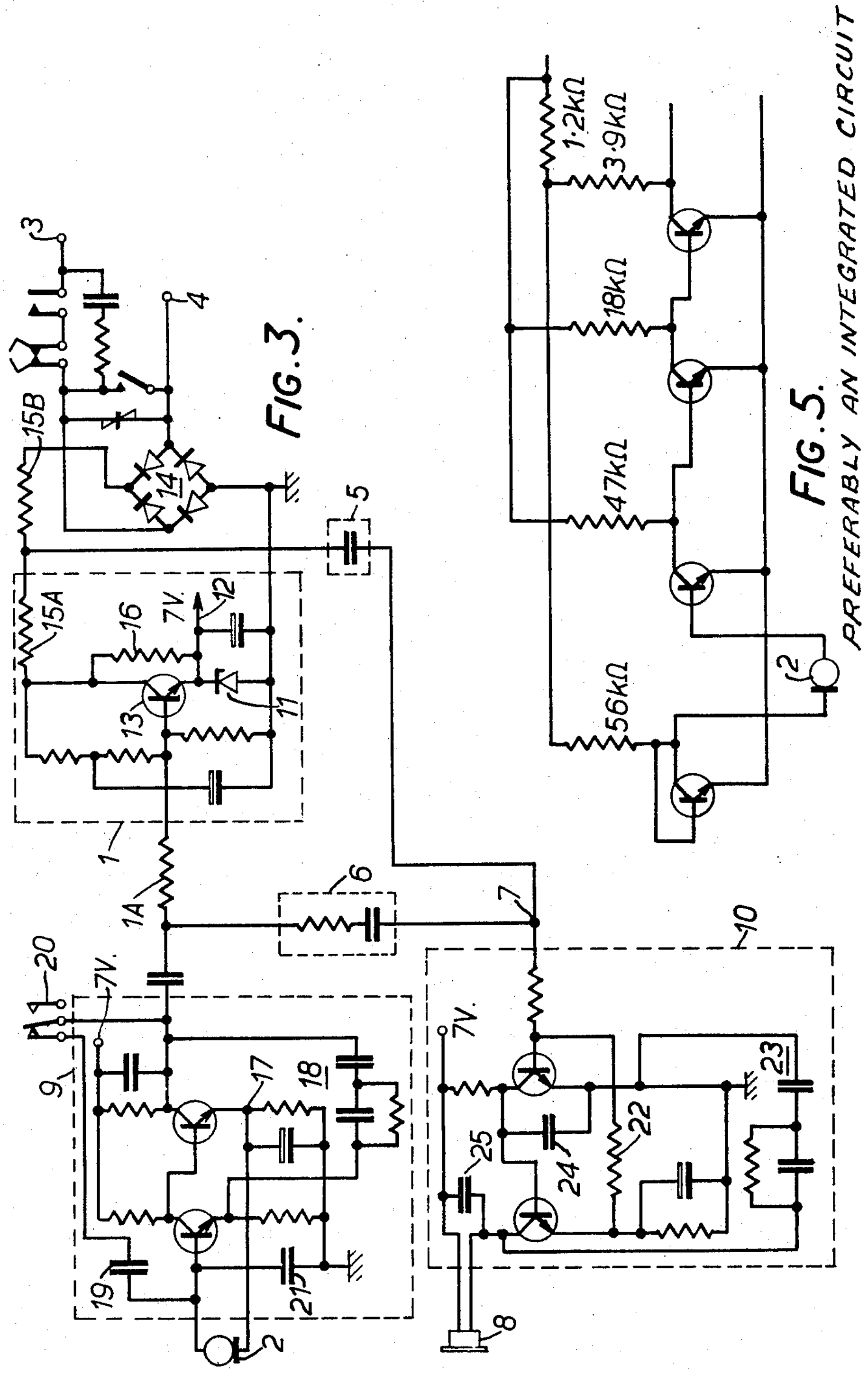
FIG. 3 is a complete circuit diagram of the preferred embodiment of the invention.
FIG. 5 shows the circuit of a suitable amplifier for use in the embodiment of FIG. 2 and 3 employing integrated circuit techniques.

In FIG. 3 the circuit of FIG. 2 is developed further, the amplifiers 9 and 10 being shown in detail and the switches incorporated in the subscriber's instrument also being included. Considering first of all the amplifier 9 for the transmitter 2, this consists of two grounded emitter transistor stages directly coupled together and provided with both d.c. and a.c. negative feedback to stabilise the amplifier, adjust its gain and also its overall frequency response. The d.c. negative feedback results from the connection to the emitter of the second transistor at the point 17 of the transmitter 2 whilst a.c. negative feedback is provided by the network 18 connected from the collector of the second transistor to the emitter of the first transistor. This amplifier also incorporates a capacitor 19 which is selectively connected from the collector of the second transistor to the base of the first transistor in dependence upon the position of the switch 20 controlled by the cradle for the hand-set of the instrument, the effect of this capacitor being that when the cradle is down the amplifier 9 becomes an oscillator which is energised by a calling tone signal from the exchange lines operative to energise the transmitter 2 to produce an audible calling signal; the transmitter 2 must be a suitable type of transducer to perform this. The transmitter 2 is used for the calling signal rather than the receiver 8 to avoid possible damage to a user's hearing should a calling tone accidentally be generated whilst his ear is against the receiver. The amplifier 9 also includes a capacitor 21 connected from the base of the first transistor to the common return in order to damp out high frequency coupling between the transmitted 2 and the receiver 8 caused by the interlead capacity of the hand-set cable. The capacitor across the collector load of the second transistor also serves to restrict high frequency response and ensure stability of the amplifier.

The receiver amplifier 10 is similar in design to the transmitter amplifier 9 having two grounded emitter transistor amplifier stages d.c. coupled together with d.c. negative feedback provided by resistor 22 connected from the emitter of the second transistor to the base of the first, and a.c. negative feed back provided by network 23 connected from the collector of the second transistor to the emitter of the first transistor. Shunt capacitors 24 and 25 are provided to restrict the response to high frequency signals and ensure this stability of the amplifier. The voltage gain of the amplifier 10 is approximately 20 dB and its input is connected through an input resistor to the tapping point 7 to reduce interference in the balance between the impedances 5 and 6 by the input impedance of the amplifier. Both amplifiers 9 and 10 are powered by a 7 volt d.c. supply produced by the zener diode connected in the emitter circuit of the transistor 13 of the amplifier 1.

The amplifier 1 is generally similar to that shown in FIG. 2 except that resistors 15A and 15B are connected between the collector of the transistor 13 and the rectifier bridge 14, and the collector emitter path of the transistor 13 is shunted by a resistor 16. The resistor 16 serves as an excess power dissipating resistor to protect the transistor 13 under short line conditions and also to stabilise the impedance of the subset. The resistors 15A and 15B are current limiting resistors which limit the collector current of the transistor 13 on very short line conditions and they also serve to trim the subset impedance. The impedance of the subset is determined by the values of resistors 15A, 15B and 16 and the capacitance of the capacitor 5.

As well as acting as an amplifier, the circuit 1 also provides a sink for the excess d.c. power received from the exchange under short line conditions and in addition provides, by means of the zener diode 11, a 7 volt supply to power the amplifiers 9 and 10. The capacitor connected in parallel with the diode 11 is a reservoir maintaining a substantial constant supply voltage when a 25 Hz ringing signal is received from the exchange. As described above with reference to the amplifier 9, the voltage derived by rectification of the 25 Hz ringing signal when applied to the amplifier 9 causes it to act as an oscillator using the microphone as a transducer to generate an audible calling signal.

Figure 4:
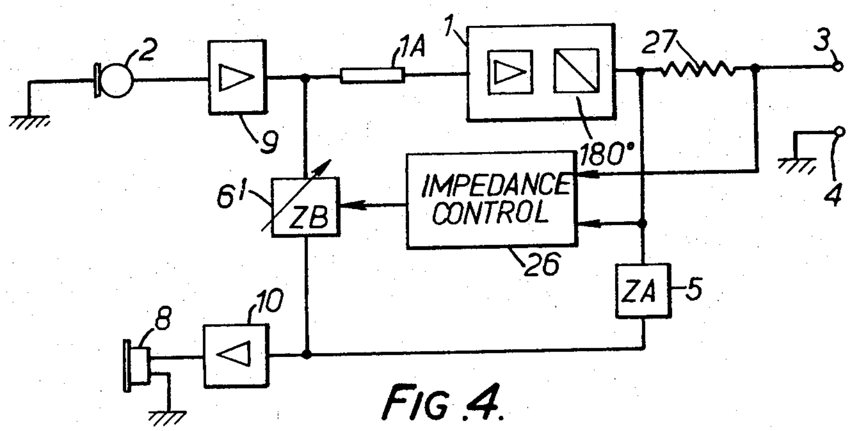
FIG. 4 shows the basic circuit of a second embodiment of the invention.

As previously discussed, the impedance of the exchange line can vary considerably depending on its length and, therefore, of necessity, the balance impedance provided by the circuit is a compromise and its matching to the line impedance is dependent on the length of the line and on the components in the exchange. The matching can be improved by the use of an active element in the balance impedance so that the impedance value is automatically regulated in dependence upon the characteristics of the exchange line. One example of a circuit by which this may be achieved is shown in FIG. 4 which is a development of the basic circuit shown in FIG. 1 in which the impedance ZB included in the block 6' is made adjustable and is controlled by an impedance control circuit 26 which is responsive to the voltage at the terminal 3 and the voltage set up across a resistor 27 connected between the output of the amplifier 1 and the terminal 3. When a d.c. signal is transmitted along the line to the subset the voltage across the resistor 27 provides a measure of the current along the line and the voltage at the terminal 3 relative to the terminal 4 is the input voltage to the subset so that these two quantities provide all the information necessary to determine the impedance of the line. These two voltages are applied to the impedance control circuit 26 which contains suitable analogue control circuitry for producing an output signal regulating the value of ZB so that the impedance presented by the subset to the line closely approximates to the impedance of the line itself.

Although in the preferred embodiment of the invention described above the transmitter and the receiver each have an amplifier, these amplifiers are not essential to the invention and one or both of them can be dispensed with, the values of impedances ZA and ZB being suitably adjusted.

With regard to the amplifiers 9 and 10 themselves, these have been described as constructed in discrete component form. These amplifiers could, however, be replaced by suitable integrated circuits in which the use of capacitors is eliminated. FIG. 5 shows an example of a suitable circuit for such an integrated circuit amplifier used to amplify the signal from the transmitter 2. The amplifier for the receiver would be of similar design.

Moreover, the invention is not restricted in this application to the use of electro-dynamic transducers as the transmitter and receiver although they are preferred.

Other types of transmitter and receiver could be used, the impedance characteristics of the circuit being adjusted accordingly. Although the circuits described have employed n-p-n transistors exclusively some or all of these could be replaced by p-n-p types subject to rearrangement of the circuit in a manner well known to those skilled in the art.

The subset circuit described above operates with much less current than previously proposed subset circuits and is, therefore, particularly suitable for use with electronic exchanges.

I claim:

1. A circuit arrangement for a telephone subscriber's instrument for connection to the conductors of a telephone exchange line, comprising a transmitting means having a single transistor amplifier for connection to the line and providing a desired output impedance characteristic and a 180° phase shift, the exchange line being connected so as to form the output load of the amplifier, a receiving means, and a tapped impedance circuit connected from the output to the input of the amplifier, in which the impedance of the tapped impedance circuit is chosen so that the arrangement presents to the conductors of the exchange line substantially the same impedance as the conductors of the exchange line present to the arrangement, said receiving means being connected from the tapping of the tapped impedance circuit to the emitter circuit of the transistor so that sidetone from the transmitting means in the receiving means is reduced, wherein the transistor of the amplifier is connected in grounded emitter configuration, with the conductors of the exchange line respectively connected to the emitter and collector circuits of the transistor amplifier, the transmitting means is connected to apply a signal between base and emitter of the transistor, and the tapped impedance circuit is connected from the collector of the transistor to its base.

2. An arrangement according to claim 1, in which there is provided a second amplifier for amplifying an output signal from the transmitting means and applying the amplified signal across the base and emitter electrodes of the transistor.

3. An arrangement according to claim 1, in which there is provided a third amplifier, having an input connected from the tapping of the impedance circuit to the emitter circuit of the transistor and an output connected to the receiving means so as to amplify the signal appearing at the tapping, and applying the amplified signal to the receiving means.

4. An arrangement according to claim 2, in which a zener diode is provided in the emitter circuit of the transistor and a substantially constant supply voltage for the second amplifier is derived from across the zener diode.

5. An arrangement according to claim 3, in which a zener diode is provided in the emitter circuit of the transistor and a substantially constant supply voltage for the amplifier is derived from across the zener diode.

6. A circuit arrangement for a telephone subscriber's instrument for connection to the contacts of a telephone exchange line, comprising a transmitting means having a single transistor amplifier for connection to the line and providing a desired output impedance characteristic and a 180° phase shift, the exchange line being connected so as to form the output load of the amplifier, a receiving means and a tapped impedance circuit connected from the output to the input of the amplifier, in which the impedance of the tapped impedance circuit is chosen so that the arrangement presents to the conductors of the exchange line substantially the same impedance as the conductors of the exchange line present to the arrangement, said receiving means being connected from the tapping of the tapped impedance circuit to the emitter circuit of the transistor so that sidetone from the transmitting means in the receiving means is reduced, wherein the transistor of the amplifier is connected in grounded emitter configuration, with the conductors of the exchange line respectively connected to the emitter and collector circuits of the transistor amplifier, a second amplifier is provided for amplifying an output signal from the transmitting means and applying the amplified signal across the base and emitter electrodes of the transistor, the tapped impedance circuit is connected from the collector of the transistor to its base, and switchable feedback means is provided in the second amplifier to enable that amplifier to oscillate at an audible frequency, so that in response to a calling tone signal from the exchange an audible calling signal is generated by the transmitting means when the feedback means is effective.

* * * * *